United States Patent [19]
Gable

[11] Patent Number: 6,029,165
[45] Date of Patent: Feb. 22, 2000

[54] SEARCH AND RETRIEVAL INFORMATION SYSTEM AND METHOD

[75] Inventor: Gary A. Gable, Port Charlotte, Fla.

[73] Assignee: Arthur Andersen LLP, Chicago, Ill.

[21] Appl. No.: 08/967,775

[22] Filed: Nov. 12, 1997

[51] Int. Cl.[7] .................................................. G06F 17/30
[52] U.S. Cl. ..................................... 707/3; 707/1
[58] Field of Search .................................. 707/3, 1, 4, 5, 707/104

[56] References Cited

U.S. PATENT DOCUMENTS

| | | | |
|---|---|---|---|
| 5,659,742 | 8/1997 | Beattie et al. | 707/104 |
| 5,675,788 | 10/1997 | Husick et al. | 707/104 |
| 5,717,914 | 2/1998 | Husick et al. | 707/5 |
| 5,737,734 | 4/1998 | Schultz | 707/5 |
| 5,742,816 | 4/1998 | Barr et al. | 707/104 |
| 5,873,076 | 12/1998 | Barr et al. | 707/3 |
| 5,920,858 | 7/1999 | Kitabayashi et al. | 707/4 |

OTHER PUBLICATIONS

Dunlap, C., "Informix releases new version of Web development tool", *Information Week*, Jun. 17, 1996.

Higgins, K., "Your Agent is Calling—They may still look like Web browsers, but agents are gaining sophistication and coming your way", *Communications Week*, Aug. 5, 1996.

Jacobs, I., "A World of Choices—Oracle, Informix and Sybase offer ways to Web–enable databases", *Information Week*, Jun. 15, 1996.

Marshall, M., "Oracle Goes Modular—'Cartridges' ease development of custom applications", *Information Week*, Sep. 30, 1996.

Rodriguez, K., "Excalibur Advances retrieval", *Communications Week*, Nov. 6, 1995.

Rodriguez, K., "Searching the Internet—Demand for Internet file retrieval fuels growth of search engine market", *Interactive Age*, Jul. 31, 1995.

Smith, T., "'MERGER': Informix, Illustra team up—Universal Database On Its Way", *Information Week*, Feb. 19, 1996.

*Primary Examiner*—Paul R. Lintz
*Assistant Examiner*—Sanjiv Shah
*Attorney, Agent, or Firm*—Merchant & Gould P.C.

[57] ABSTRACT

A system and method for search and retrieval of electronic objects, the objects including electronically encoded information. The system and method use an electronic lexicon which is configured to provide predefined search elements that are designed to identify objects relevant to a specific community. Format filter modules identify a format of an electronic object to be searched and enable the search using the search elements within the lexicon.

30 Claims, 12 Drawing Sheets

FIG. 4

ENTERPRISE COMMUNITY

| Operating Your Business-Budgeting | | |
|---|---|---|
| Topic | Subtopic | Logic Atom (expressed in Microsoft Indexing Server syntax) |
| Best Practices: Budgeting | | ((budgeting**) NEAR ("best practices" OR benchmarking** OR "best performers")) |
| Capital | | ((budgeting**) NEAR (capital OR asset** OR property OR resources OR facilities** OR "office space" OR furniture OR technology OR hardware OR software) NEAR (creating** OR developing** OR updating** OR "timing of updates" OR revising** OR revisions** OR "how to" OR "what about" OR contents** OR sections)) |
| Facilities | | ((budgeting**) NEAR (facilities** OR building OR equipment OR plant OR structure OR "office space" OR furniture) NEAR (creating** OR developing** OR updating** OR "timing of updates" OR revising** OR revisions** OR "how to" OR "what about" OR contents** OR sections)) |
| General Budgeting Techniques | | (budgeting**) NEAR (techniques** OR methods** OR procedure** OR system** OR approach** OR methodology OR "time period")) |
| Operating | | ((budgeting**) NEAR (operating** OR people OR payroll) NEAR (creating** OR developing** OR updating** OR "timing of updates" OR revising** OR revisions** OR "how to" OR "what about" OR contents** OR sections)) |

SEARCH AND RETRIEVAL INFORMATION SYSTEM AND METHOD

FIELD OF THE INVENTION

The present invention relates generally to information systems, and more particularly to a broad-based information system for searching and automatically retrieving information stored across multiple platforms while parsing and filtering that information according to a particular community of interest.

BACKGROUND OF THE INVENTION

Easy and efficient access to information has become essential to maintaining an effective organization. Most information is stored and accessed from discrete sources on internal networks where the organization's financial and document systems are maintained. However, because of increased use of the Internet and newsfeeds, the demand for external information has also grown. To access these different sources of information, a wide variety of search and retrieval systems are used. However, many systems often fail to deliver information which is relevant to the specific needs of each user. Furthermore, many systems are limited by their inability to traverse different platforms and operating systems to search multiple sources of information and deliver the information to a single location. These limitations are counterproductive to the user's needs for an easy and efficient method of accessing information across multiple platforms.

Many existing search and retrieval systems require the user to specify a query statement on search criteria. Typically, such systems enhance the user supplied query using word associations similar to a thesaurus. However, because these word associations are generic, these systems often do not focus the search to the specific needs of the user. Consequently, for the search to yield germane information, the user typically either sifts through the information to determine its relevancy or performs several iterations of the search each time refining the search strings. This process is time-consuming and inefficient.

Similarly, some systems allow users to personalize their search and achieve a high degree of specificity. However, the user must learn and use complex search syntax that is often difficult for the user to understand, search iteratively, and carefully craft the query in order to obtain specific results. For example, many search systems require the user to input search strings using Boolean operators. Hence, for the search to be effective, the user must be proficient with the usage of Boolean operators. Otherwise, the search may not produce useful information and may be too time consuming.

Another problem with many current search systems is that they require individual user-initiated queries, instead of providing a flow of highly relevant information on numerous topics. Separate queries are usually required for separate topics, and these queries need to be repeated by the user at appropriate time intervals. This need to initiate a separate query for each topic of interest further lengthens the process and exacerbates inefficiency.

Furthermore, many existing search and retrieval systems are limited to searching certain sources of information. This severely confines the usefulness of these systems because users are often required to perform the same searches on different systems to access all potential sources of information, both internal to and external to the user's system. The inefficiencies inherent in this process are compounded in light of the inability of most systems to retrieve information relevant to the needs of the user, and the need for the user to initiate separate queries for each topic of interest.

No system currently exists that retrieves a flow of information from sources originating from multiple platforms and operating systems while ensuring its relevancy to the user. While users currently have access to many sources of information for managing their operations, the sources of information are varied. Organizations need access to a wider range of information and an ability to tailor that information to the specific needs of the user. An information system is needed wherein all potential sources of information can be easily and automatically searched, and only relevant information is retrieved and displayed to the user.

The present invention provides a system for search and retrieval of electronic objects, the objects including electronically encoded information. The system is made up of at least a searching subsystem, which includes one or more electronic lexicons in a memory within the system, and a format filter subsystem coupled to the searching subsystem. The electronic lexicon provides predefined search query elements that are contextualized for specific communities, to identify objects that are relevant to the selections of specific individuals. The format filter subsystem includes several format filter modules that operate to identify a format of an electronic object and then select a format filter module that will enable the system to search the object using the search logic elements within the lexicon.

The present invention also provides for a method for search and retrieval of electronic objects, including identifying a format of an object to be searched, selecting a format filter module that is configured to enable searching, and searching the object using predefined search elements that are found in an electronic lexicon. An aspect of another embodiment of the method is that retrieved objects may be delivered to the user in a single viewing format.

BRIEF DESCRIPTION OF THE DRAWINGS

The invention may be more completely understood in consideration of the detailed description of various embodiments of the invention which follows in connection with the accompanying drawings, in which:

FIG. 4 shows an example of several lexicon entries in a search and retrieval information system.

Figure 1:
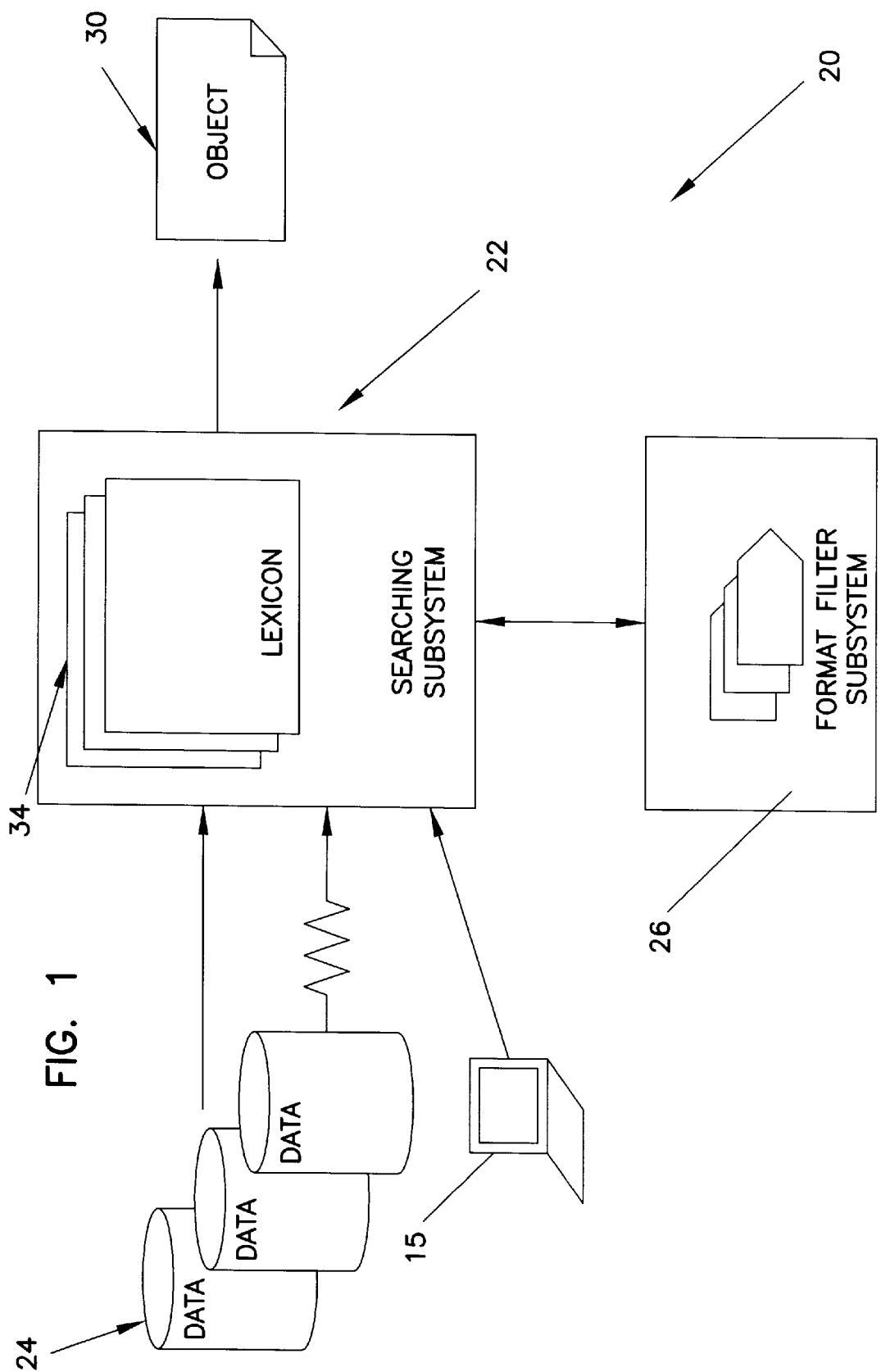
FIG. 1 is an overview block diagram of a search and retrieval information system.

While the present invention is amenable to various modifications and alternative forms, specifics thereof have been shown by way of example in the drawings and will be described in detail. It should be understood, however, that the intention is not to limit the invention to the particular embodiments described. On the contrary, the invention is to cover all modifications, equivalents, and alternatives falling within the spirit and scope of the invention as defined by the appended claims.

DETAILED DESCRIPTION OF THE VARIOUS EMBODIMENTS

The invention is believed to be applicable to a variety of systems and arrangements which search and automatically retrieve information. The invention has been found to be particularly advantageous in application environments where system users require access to information which exists on different platforms and operating systems. While the present invention is not so limited, an appreciation of various aspects of the invention is best gained through a discussion of various application examples operating in such an environment.

Information and knowledge are essential raw materials and assets among many of today's workers, executives, and business owners. Current information management systems are typically focused on only one type of information repository. These management systems require that data be categorized or formatted in a specific way at the time of storage in order for that information to be available for search and retrieval. Therefore, current information management systems are of limited utility to most users, who need to obtain useful information from multiple types of sources.

Many executives and business owners are unable to obtain the desired kind or quantity of relevant information needed to serve business clients, help and improve their businesses, and to manage the activities of employee teams. To serve clients, many executives are in need of highly specific business and industry news and information. To help them run their own businesses, they need timely activity and status reports from their employee teams, which requires the ability to search on their own internal databases. A wide variety of financial reporting information is also essential to many executives' and business owners' success.

It is also important that information seekers are able to easily access information using a personal computer. Another complaint about current information management systems is that they are difficult to connect to and difficult to direct toward highly specific information needs. Many information management systems require that a search query be written in complex Boolean logic statements. For highly specific information requirements, very complex Boolean statements and repeated alternate search strings are often currently required. Even where a search engine may incorporate natural language capabilities, users may need repeated alternative queries and iterative refinement of the search query so that it is specific to a given industry, product type, geographic location, or time period.

The present information search and retrieval system and method is designed to address these shortcomings in current information management systems. The present information search and retrieval system and method will also be referred to as an information appliance. The term information appliance is intended to refer to the system as a whole. The information appliance described can search diverse types of data and files because it is provided with format filter modules in order to be able to access information in various formats. For example, the information appliance may easily search documents that are internal to the user's system, or external commercial databases. Format filter modules may first identify an object's format, then use a specific filter module to read and search the object. The term "object," or "electronic object," will be used to refer to any type of electronic information that can be searched and accessed. Examples of electronic objects could be text documents such as newspaper articles, trade journal articles, report documents, or financial reporting information within an electronic database. In one embodiment the information appliance may also access, for example, Domino Notes® documents, relational database tables, object-oriented records, and other documents, records and databases.

In order to help a user obtain highly relevant information, without knowledge of complex Boolean search string construction, the information appliance provides predefined search elements designed to identify electronic objects that will be most useful to the user's community. A list of topics for each community allows the user to easily describe the desired range of the search. Each topic may be associated with the predefined search criteria that is highly specific to the user's industry or community. An example of a topic is "general budgeting techniques." Some topics are more broadly indicative of an industry context, such as a geographical context like "South America" or a time frame like "Spring, 1996." Some topics are more like subtopics, such as the subtopic "pricing strategy" being more specific than the topic "marketing plan."

Each topic typically is linked to a predefined search query that is designed to gather information on the topic relevant to the user. The search query may contain words frequently found within a discussion relating to the topic and may look for those words in the object being searched. When the user specifies two topics, the information appliance may link the two search queries associated with the two topics and thereby execute a highly specific search. Throughout this description, the term "topic" will be used to refer to not only a topic but a subtopic and context association, where each is linked to a stored search element. A topic could also be a type of document, such as receivables reports or status reports. If the topic is a type of report, the search query may look for certain types of document names, or indicative words within the document. A topic may also be a specific document, storage location, or address, such as a web site address, where relevant information resides. In this case, the search element may be just the document name and location, so that the document is retrieved when the search is executed. A user creates a new topic when the user combines a topic with a context association. A user may also create a new topic by defining a new search query entirely. The search query associated with each topic is herein termed a search atom or search element. When several search atoms are linked, the resulting highly specific search string is termed a search molecule.

Figure 3:
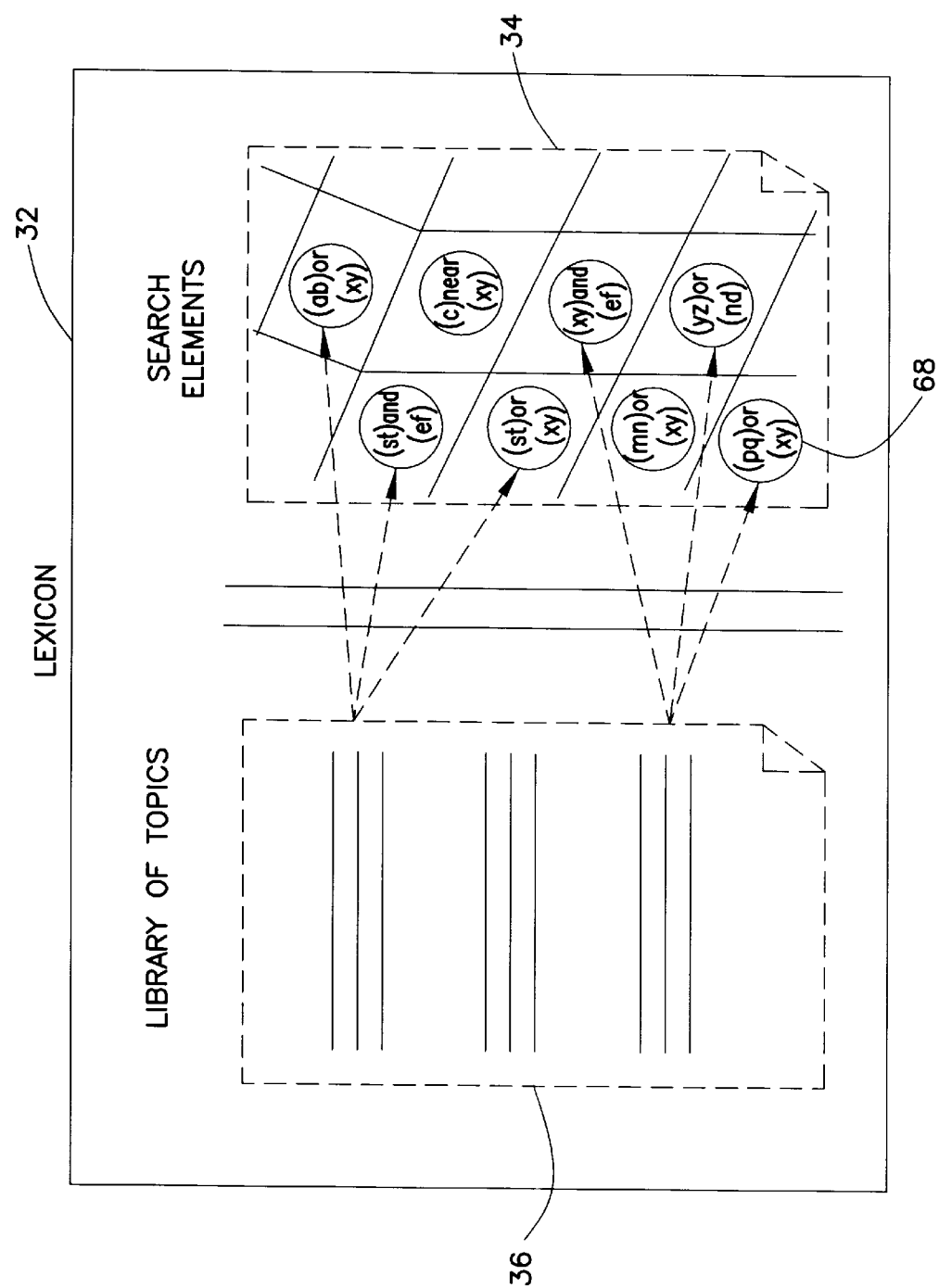
FIG. 3 is a functional drawing of a lexicon using a search and retrieval information system.

FIGS. 3 and 4 illustrate a lexicon. FIG. 3 shows a lexicon 32 as being made up of a library of topics 36 and a set of search elements 34. Within the present system, a lexicon is typically a storage framework of search elements or search atoms, each linked to one or more topics in the library of topics. When a topic is chosen by the user to be searched, the search query that is linked to the topic is used to carry out the search. When a topic appears to the user in the interface for viewing selection, the topic may be linked to a single search atom, or the topic may be linked to a compounded query or search molecule which incorporates more than one independent search query. The type of links associated with each topic depends on the topic.

FIG. 4 shows an example of the topics being linked to the search elements in a different way of showing lexicon 32. The community lexicon shown in FIG. 4 is for a community termed Enterprise. Some topics within the Enterprise community lexicon include best practices: budgeting, capital, facilities, and operating. It is also possible to have more specific subtopics within each topic. The right-hand side of the chart of FIG. 4 shows search queries that are linked to each topic. For example, the search query linked to the topic "capital" is very lengthy and lists examples of capital that might be found in a discussion of capital in the Enterprise context. In one embodiment of the present information appliance, the user will be able to designate the topic "capital" within the community "Enterprise" and have the benefit of the complex preprogrammed search criteria.

FIG. 1 illustrates one particular embodiment of an information system for searching and retrieving electronic objects across multiple platforms and operating systems. Referring to FIG. 1, the system 20 shown includes a searching subsystem 22 which is capable of accessing data 24 stored across multiple platforms and operating systems. Some data accessed may be internal to the system, while some data may be accessible through a remote communication line. Because the system accesses data resources from various platforms, the searching subsystem interfaces with a format filter subsystem 26 to search data of varying formats. Electronic lexicon 34 is used by the searching subsystem to search the data and identify electronic objects 30 which are specifically relevant to the information needs of the user. Thus, the lexicon typically stores search elements that reflect the user's community of interests and returns only those electronic objects which are specific to the user's interest and the interest of the user's community.

Figure 2:
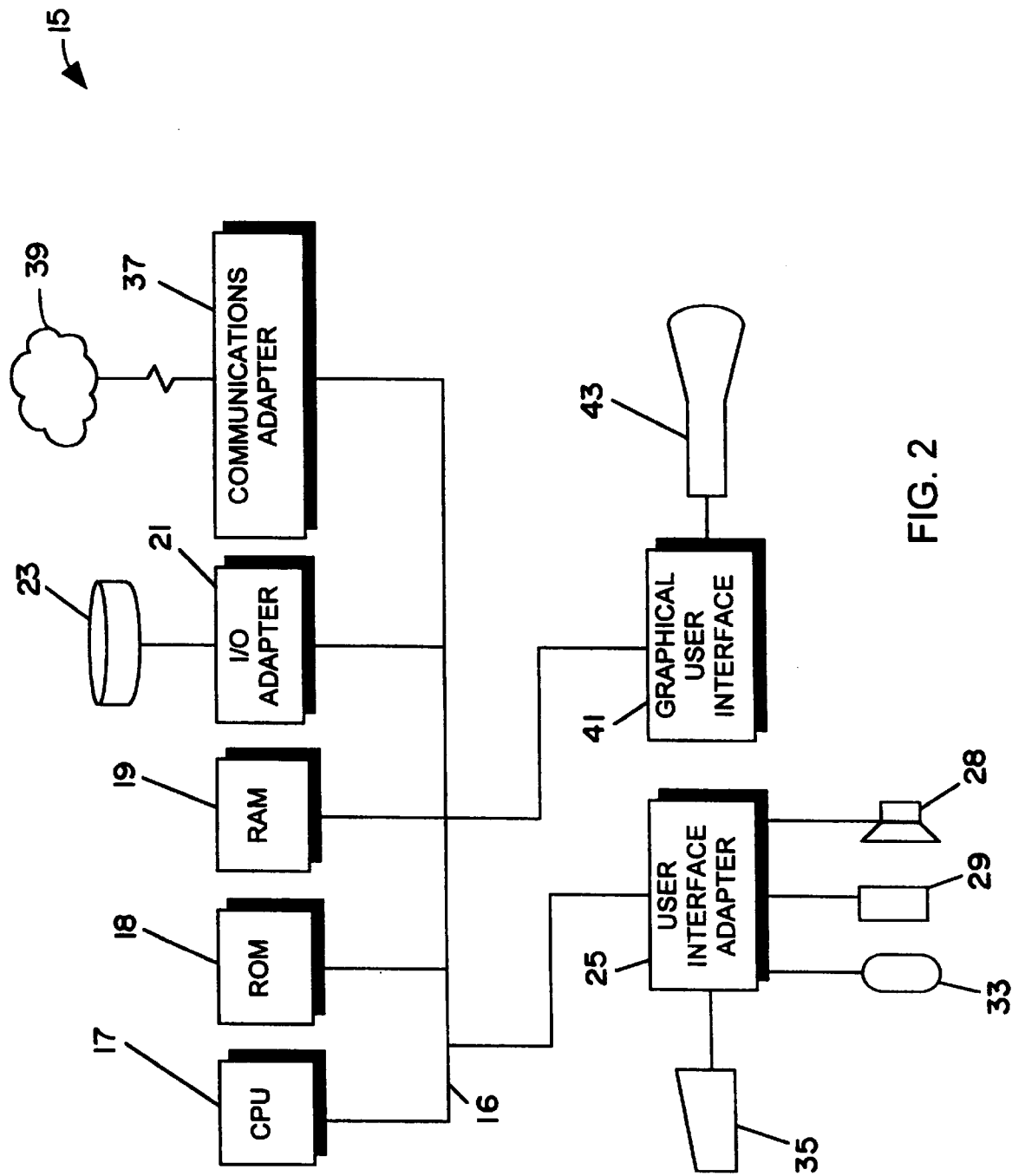
FIG. 2 is a block diagram of a personal computer system.

The information appliance may be used with many different computer systems. In a client/server system, each user is provided with a user terminal, such as a personal computer, which may be linked to a modem, communication lines, network lines, a central processor, and databases. An NT or UNIX server, for example, may be used with this system. The user terminal provides the user with a way to input the user's preferences to the information appliance and a way to view the electronic objects retrieved. The preferred embodiment of the information appliance may be practiced with the user terminal 15 of FIG. 1 being a personal computer such as an IBM®, Compaq®, Dell®, or Apple® Macintosh® personal computer. As previously indicated, user terminal 15 may preferably be part of a client/server system. A representative hardware environment of the user terminal is shown in FIG. 2. The preferred hardware configuration includes a central processing unit 17, such as a microprocessor, and a number of other units interconnected by, for example, a system bus 16. The computer of a terminal 15 may also be spread out over one or more interconnected computers or computer systems.

The user terminal shown in FIG. 2 also includes a Random Access Memory in (RAM) 19, Read Only Memory (ROM) 18, and an I/O adapter 21 for connecting peripheral devices such as disk storage units 23 to the bus 16. A user interface adapter 25 for connecting several input devices is also included. Examples of possible input devices connected to the user interface adapter 25 include a keyboard 35, a mouse 29, a speaker 28, a microphone 33, and/or other user interface devices such as a touch screen or voice interface (not shown). A communication adapter 37 is included for connecting the user terminal to a communication network link 39. A graphical user interface 41 is also connected to the system bus 16 and provides the connection to a display device 43. It will be apparent to those in the art that the mouse 29 may be a typical mouse as known in the industry, a trackball, light pen, or the like.

The user terminal typically has resident thereon an operating system such as Windows®, Windows NT®, Apple System 7®, IBM OS/2®, or UNIX® software. The network also has a resident operating system, for example, Novell® Netware or Novell® Intranetware, among other possibilities. In the preferred environment, the desktop typically has Internet browser software, such as MS Internet Explorer or Netscape Navigator. In the alternative, the network software operating system may not be available separate from the work station operating system, and the network operating system may have an integrated Internet browser. Other alternatives for client and server software include Oracle® or Microsoft Sequel Server.

A networked personal computer environment, a client/server system, a mainframe terminal environment, WEB TV terminal environment, dumb terminal environments, a networked computer environment that is connected to an Internet site or a personal computer alone could be used to implement the information appliance. Any type of system that allows the user to receive target objects and documents and use an input device to set up a user profile could be used with this system. Depending upon the user's needs, a client/server system may be the most preferable computer system for implementing the information appliance.

Figure 5:
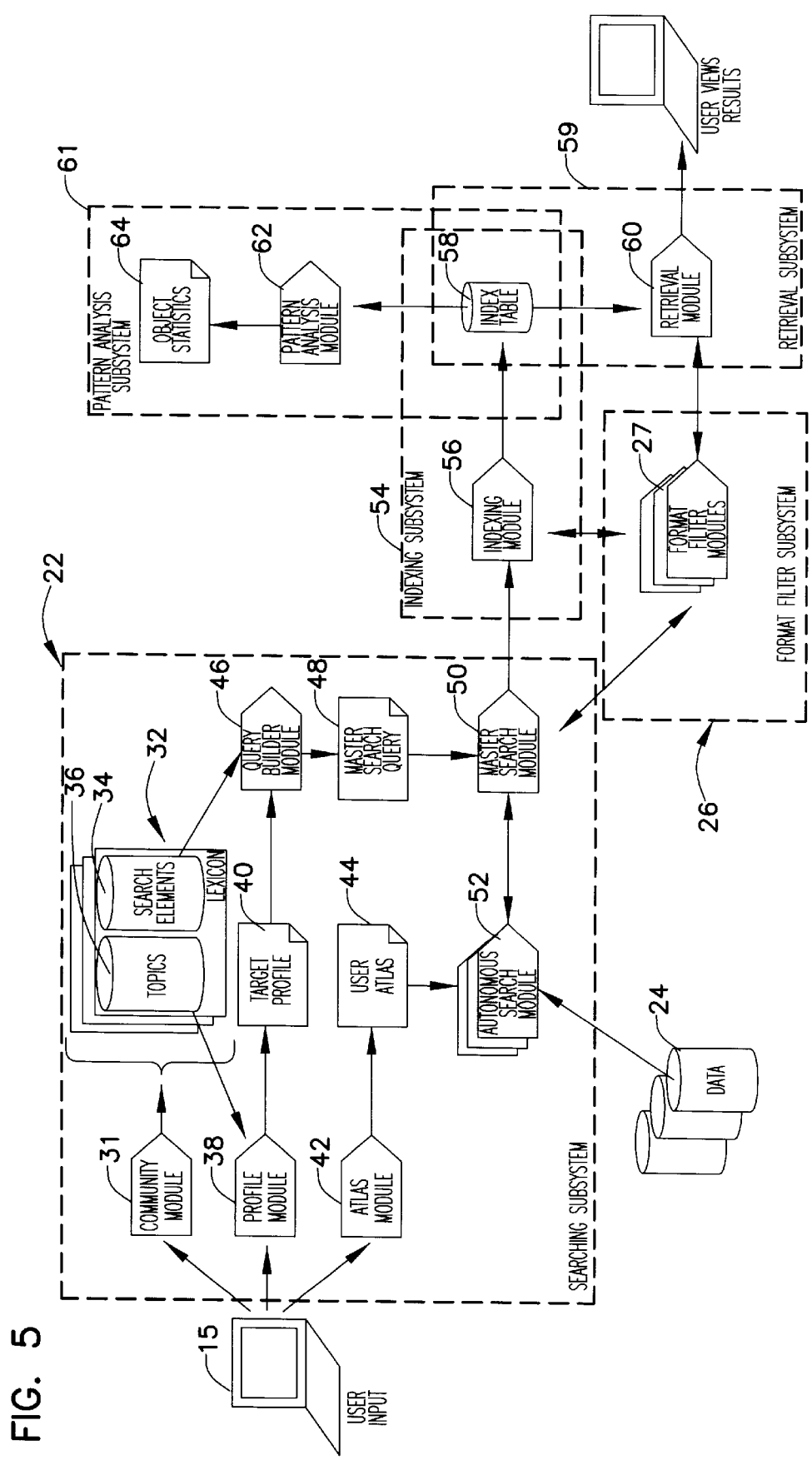
FIG. 5 is a more detailed block diagram of a search and retrieval information system.

FIG. 5 shows a more detailed diagram of several subsystems of an information system. A user terminal 15 is used to input user information into the searching subsystem 22. A community module 31 allows users to select at least one community 32 which defines a group of users with common interests and a common vocabulary. Examples of groups of people who make up a community might be advertising executives, accountants, higher education counselors, members of a corporation or members of a department within a corporation. Each of these groups of people typically share a specialized professional or organizational vocabulary. The term "lexicon" as used in this application refers to a location in the system memory where search elements expressing the special vocabulary for each group is stored, in order to be used in sophisticated, very targeted searching. Each lexicon typically stores a bank of complex search query specifications 34 using the special vocabulary, or semantic context, of the group. Furthermore, within the lexicon, there may be a library 36 of topics, subtopics, context associations and document types that are of interest to the community, each linked to one or more of the stored search queries.

A profile module 38 may be configured to allow users to choose topics or subtopics from the library of topics 36 which are relevant user's current search needs. Similarly, the user can specify or link additional contextual criteria such as specific geographic locations, industries, or company names. The term "topic" could encompass topics, subtopics or context associations that are listed in the library of topics 36. The term "topic" may also refer to a document type, like a receivables report or a status report, or to a storage location, such as a web site address. In addition, a user may create her own topic, when she combines a topic with a context, for example. For each user, the profile module is typically configured to write this information to a target profile 40 which is accessed by a query builder module 46 discussed below, such that the target profile 40 stores the user's list of topics for which automatic searching is desired.

In conjunction with user's target profile and topics specified therein, the present system is typically configured so that the user can specify sources of data to be searched by accessing an atlas module 42 that creates the user atlas 44. The user atlas specifies the content sources, systems, and locations to be searched by the information system on a regular basis. The user atlas 44 may list internal database locations, external database locations or both.

A query builder module 46 is typically employed to read the target profile. For each entry in the target profile, the query builder module refers to the community lexicon to build a master search query 48 which specifies the information the system must retrieve. By way of example, the master search query 48 may be several search queries associated with several topics linked together or the master search query 48 may be just one search query from the lexicon. A typical process of how the query builder module creates the master search query is described in more detail below. A master search module 50 may be employed to read the master search query and to create autonomous search agents 52 which perform the searches using the criteria in the master search query and at the locations specified in the user atlas. The autonomous search agents use an appropriate format filter for the document locations. Each autonomous search agent searches the data 24 and returns electronic objects that satisfies the search criteria in the master search query. The data 24 may be located internally to the computer system or may be found on external databases that are accessed via communication lines. The electronic objects typically are returned to the master search agent for subsequent indexing and delivery to users.

An indexing subsystem 54 may be employed to create an index of all the terms in an electronic object. Using the index, queries can be run quickly for indexed documents.

There are several different ways an indexing subsystem module 54 could be used. An indexing module could create an index of all terms in all documents residing locally on the system, enabling these locally resident documents to be searched very quickly. In the alternative, indexing can be configured to be performed only when the local documents are identified by the searching subsystem as being relevant. The indexing module may also preferably create a usable index of all terms in each electronic object 56 returned from external sources by the master search module.

Documents that have been indexed are available for easy future use within the community. When an index of a document exists, autonomous search agents 52 typically are not utilized. Rather, the master search query 48 normally operates directly on the index.

A typical indexing module accesses the format filter subsystem 26 and selects the appropriate format filter module 27 to read and write the electronic object to an index table 58. The index table may contain an abstract of each electronic object and an electronic pointer to where the object is stored. The index terms of all locally stored documents and external documents that have been found in previous searches normally are stored on the index table 58. In such a configuration, future searching of the indexed documents will be carried out much more quickly than searches of the entire document.

In one preferred embodiment of the system, autonomous search agents are used to search external electronic databases, while the indexing module is used to search local electronic objects and previously retrieved objects from external sources. However, the autonomous agents may be used for all local queries.

When the user chooses an electronic object to view, a retrieval module 60 within a retrieval subsystem 59 is typically employed to access the index table and to select an appropriate format filter module 27 in order to return to display the electronic object to the user in the appropriate display format.

A pattern analysis subsystem 61 may be configured to contain a pattern analysis module 62 that statistically analyzes the information on the index table. Such a pattern analysis module typically produces raw statistics about the placement and frequency of term occurrence. Additional processing may optionally be performed on these statistics, either by the pattern analysis module 62 or by another module designed to use these statistics. For example, in a preferred embodiment of the system, the pattern analysis module 62 will parse the electronic objects on the index table 58 and statistically analyze the appearance of the community lexicon terminology within each electronic object. These object statistics 64 can be used to enhance the community or individual lexicon based on the frequency or infrequency of terms appearing in electronic objects satisfying the search criteria. The object statistics may also be compiled across electronic objects for analysis of subject data, for example, to review patterns of activity in the data, such as merger and acquisition data for specific companies or industries over periods of time. The activities of a typical pattern analysis module 62 will be discussed in greater detail in relation to FIG. 12.

FIG. 3 shows a more detailed diagram of a typical association between topics 36 and the set of search elements 68 within the community lexicon 34 within a typical topic, there exists one or more search logic atoms representing a complex search query specification developed within the context of the terminology and concerns of the community. Where the user creates a new topic by specifying the combination of two topics, such as specifying a topic and a context association, the query builder module may be configured to concatenate the search atoms for each of the specified topics into a compound search molecule. As an alternative, only one topic might be specified, associated with a search atom. In a typical system, the query builder module passes either the single search atom or the compound search molecule onto the master search module 50, in the form of a master search query 48. As described above, the master search module then creates an autonomous search agent for each molecule, or the master search query is used to search indexes of indexed documents. The master search module also may pass information about the search location and appropriate format filter to the autonomous search agent.

FIG. 4 shows how one preferred embodiment forms associations between a topic, subtopic, or context associations, and the corresponding search elements. The example lexicon 32 shown in FIG. 4 is for the Enterprise community, which is a community that may be suited for middle-market company CEOs and their direct reports. Once the user affiliates with the Enterprise community, she can select topics, subtopics, context associations, or report types, in any combination. A particularly useful feature of one embodiment of the present system is the ability of the system to concatenate search query elements into sophisticated, highly specific queries, in order to limit a topic to a specific context, for example. A certain topic, such as a subject or report type, might be limited to a context, such as time, place, specific companies or industries. For each topic, subtopic, context association or report type, the system maintains a search specification that describes the topic in the syntax of the search agents and index module. The user can also identify other topics which may be of value. The search atoms may be concatenated into a longer, more complex search query. Thus, the search query is a highly refined search tool for the selected topics thereby allowing the system to effectively search and retrieve information that is specific to the needs of the user.

Figure 6:
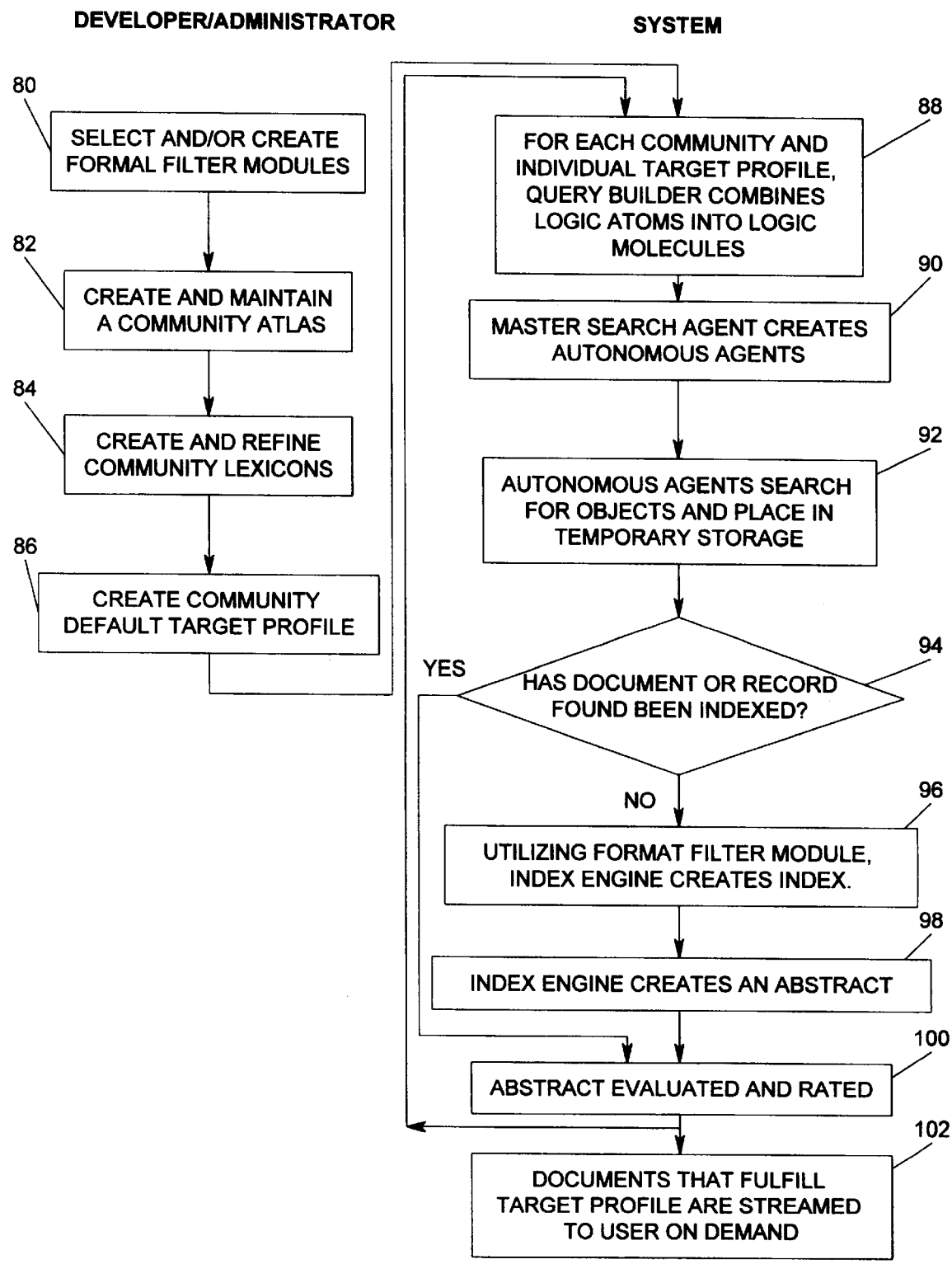
FIG. 6 is a flowchart of a search and retrieval information method.

In one mode of operation of the preferred embodiment, the information system can automatically search and retrieve electronic objects relevant to a user or community, and provide a stream of useful information to the user. FIG. 6 outlines how this process is performed. The left half of FIG. 6 shows the general steps that a developer or administrator of the present system may take to prepare the system for use by a specific community. Referring now to FIG. 6, format filter modules for each document source format are shown to be selected or created in step 80 to allow the system to search electronic objects of various formats. A community atlas is also shown as being created and maintained in step 82 to specify the systems and information resources available to the user or community. Also, the community lexicon 32 may be created and refined at step 84 so that it contains appropriate predefined queries for each topic, subtopic, context association, and report types. Similarly, a default target profile may be created 86 for a hypothetical average user in the community. In this step, the developer may choose topics from the library of topics 36 that are of broad interest to users to be stored in the default target profile. The default target profile typically will be provided to users when they first access the information appliance of the present invention, and can be used until each user creates a personalized target profile. Individual default target profiles may be provided as well.

Once these preliminary steps are performed, the query builder module can combine 88 the search atoms for each default community and individual target profile into complex search queries. Now the system can perform searching steps and stream objects to each user automatically. For each user or community target profile, the master search module may create an autonomous search agent at step 90 to search in the locations specified in the atlas. The autonomous search agent may be configured to select the appropriate format filter module to search documents of varying formats and return the electronic objects at step 92 which satisfy the criteria of the search molecule. In such a configuration, the system then typically checks to determine whether the electronic object has already been indexed for another user or community at step 94. If the electronic object has already been indexed, the index module may then create an abstract of the electronic object and store the electronic references for the object on the index table at step 98. If an abstract has already been created and rated, the system may proceed to step 102. If the electronic object has not already been indexed by the system, the appropriate format filter module may be accessed in step 96 by the index module to create an index of the electronic object retrieved by the autonomous search agent. At step 98, an abstract typically is created, evaluated and rated 100 for its effectiveness in fulfilling the target profile specifications for each search element for each user. The electronic objects that fulfill the target profile can be organized in a variety of views, for example, according to topic, subtopic, or context association, or report type and streamed to the user on demand at step 102.

Figure 7:
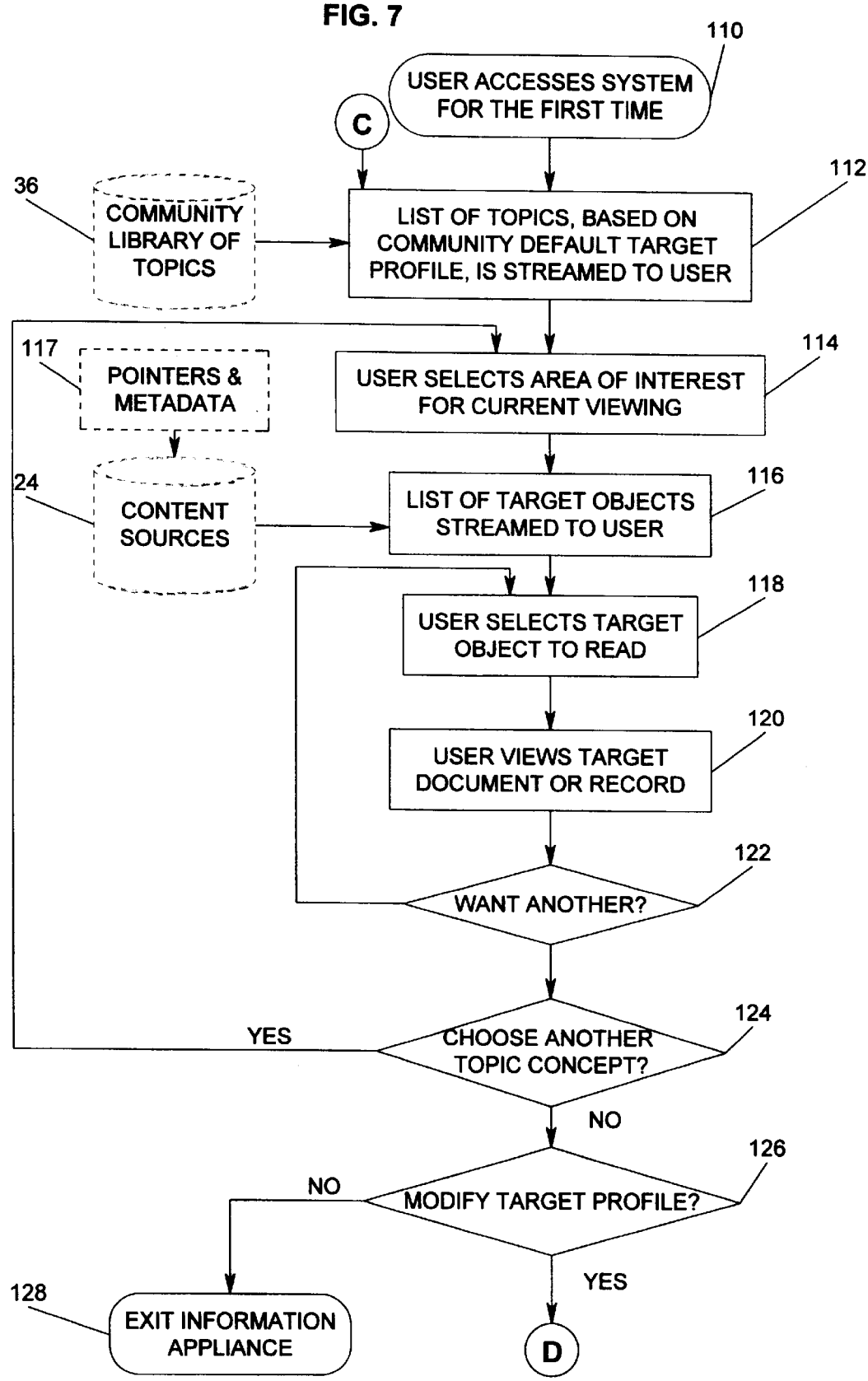
FIGS. 7 and 8 are flowcharts of a process by which users personalize a target profile in a search and retrieval information system and method.

FIG. 7 shows how a user typically retrieves the electronic objects found by the system and personalize the target profile. When accessing the information system for the first time 10, the user may be presented with a list of high-level topic areas at step 112 from the library of topics 36 that is designed for the community. Pointers and metadata 117 can be configured to store crucial information about content sources such as source location, source type, and other specifications. The user can select topic areas of interest for which electronic objects may be retrieved at step 114. The user can then select at step 116 the electronic objects of interest. The system typically delivers the first few sentences of each electronic object to the user's viewing frame. The user then selects an electronic object to read at step 118. That target object may then be streamed in its entirety to the user in step 120 so that the user can view the complete document. If the user would like to view another document at step 122, she may simply select another object from the list of electronic objects. When the user is finished viewing the found objects, another topic can be selected from the list of topic areas 124. At step 126, the user can personalize the target profile or exit the system at step 128. As discussed in greater detail in relation to FIG. 12, the system may be configured to keep track of which objects the user and all users choose to view in order to obtain statistical information about the popularity of objects. The continued steps of the user while personalizing the target profile and retrieving electronic objects are shown in FIG. 8.

Figure 8:
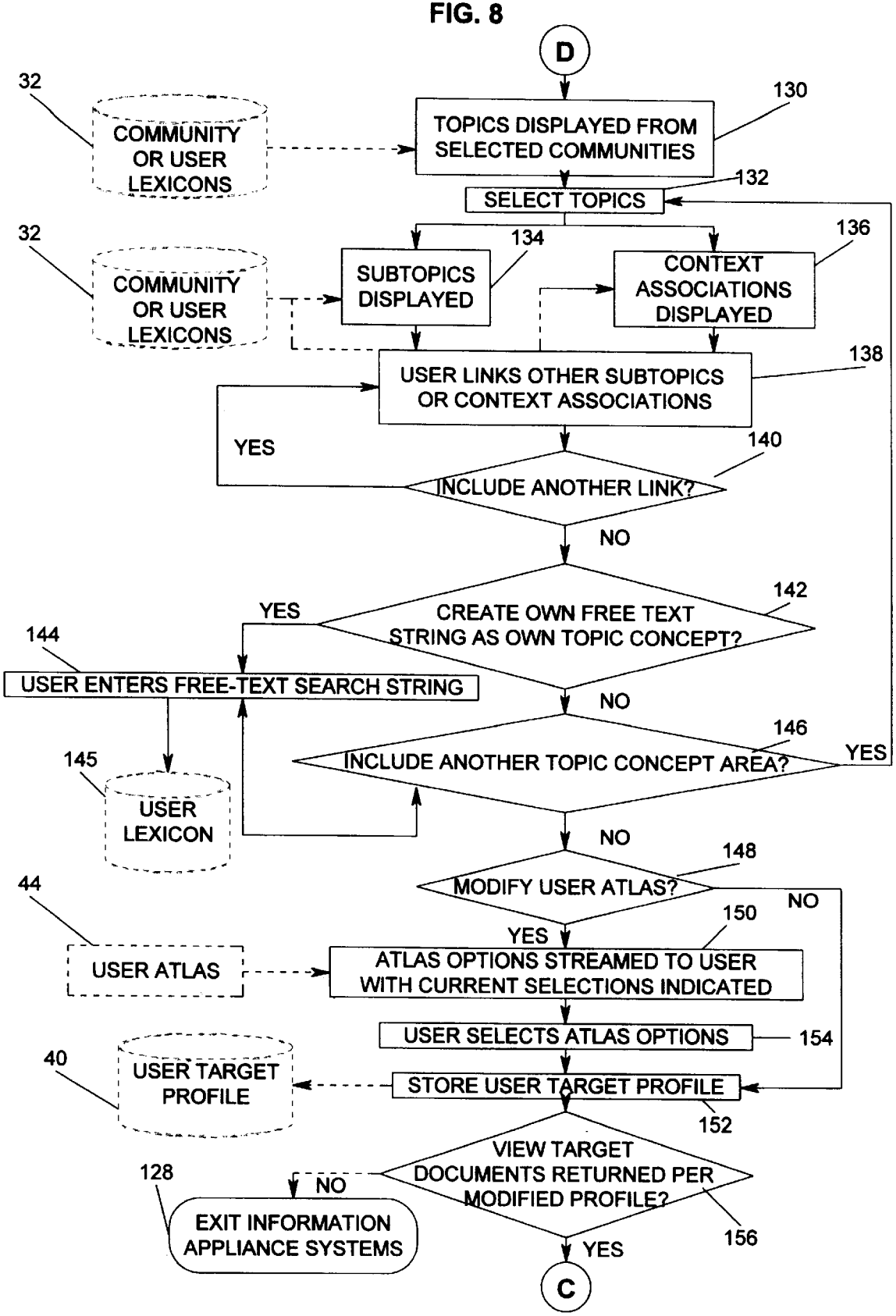

FIG. 8 shows a process by which a user can personalize, modify, or refine the target profile. The library of topics may be displayed 130 for each community lexicon associated with the user. The library of topics is stored in the community lexicon 32. If the user has already created personalized topics, as discussed further below, the user-defined topics may also be displayed at this time. After selecting the topic area of interest 132, the user typically is presented with a detailed list of subtopics 134 and context associations 136, where applicable and when available according to the structure of the subject community. Lists of other types may be shown to the user at this point also. Report types or other types of topics may also be presented. Alternatively, the subtopics, context associations, report types, and all other topics may be displayed to the user simultaneously. From the lists, the user can select 138 the subtopics or context associations of interest and select additional links at 140. The user can further personalize the search string, if desired at step 142, by creating a free text search string 144. A personalized search string may be stored in a user lexicon 145 along with other user-designated values. At this point, the user can include 146 another topic area.

The user can also modify 148 the user atlas 44. The user atlas stores locations of databases where the information appliance will search. This feature allows the user to specify information sources where the search will be most productive and results in a more efficient search by reducing the scope. If the user chooses to change the user atlas 44, the current atlas settings 150 typically are streamed to the user. Alternatively, for example, the current atlas options may be stored 152 in the target profile. From the list of atlas options, the user can select 154 the databases the system will search. After modifying the atlas, the changes made are stored in the user target profile 152.

After the system performs a search pursuant to the criteria stored in the user target profile 152, the user can view 156 the electronic objects returned by the system. After viewing the document, the user can remain in the system, returning to the list of topics at step 112 in FIG. 7, to continue to search, or exit the system 128. In the alternative, after setting up a search target profile, the electronic objects found in the search could be streamed to the user's E-mail address on a periodic schedule. Returned target documents could also be returned to the user's local hard drive or another storage place on the user's network. This delivery route may be used to allow for perusal while disconnected from remote sources, or to allow the pattern analysis module to operate on the stored retrieved documents.

Figure 9:
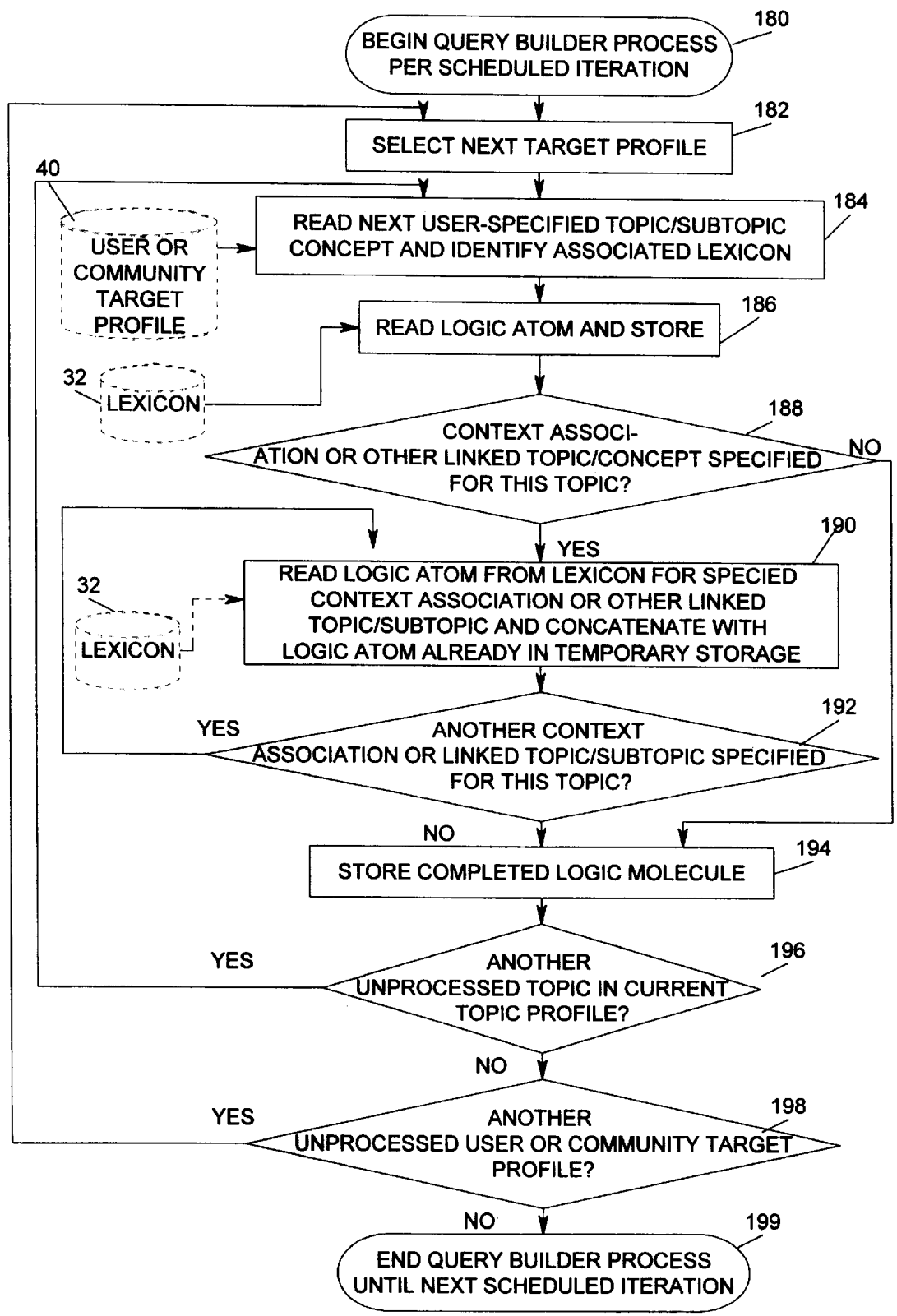
FIG. 9 is a flowchart of steps taken by a query builder module in a search and retrieval information system and method.

FIG. 9 shows a more detailed flowchart of the query builder process by which the preferred system may carry out the user-defined search. At scheduled intervals, the query builder module concatenates search atoms associated with the topics in the target profile into search molecules. The process begins at step 180. The system will then select 182 the first or next user or community target profile 40. The query builder module will read 184 the next topic from the target profile and identify the appropriate lexicon. If a user has already personalized a target profile, then the system will be accessing the user target profile at this time. However, if the user has not yet created a personalized target profile, the default community target profile will be accessed.

In the embodiment shown in FIG. 9, the search query for that particular topic is read 186 and placed in temporary storage. The query builder module will then determine if there exists a context association 188 or other relevant topics or subtopics to be combined for the specified topic or subtopic. If no context association or other topic or subtopic exists, the search molecule 194 is complete. Otherwise, the query builder module will read and concatenate 190 the search atoms for the context association or other relevant topics or subtopics to those already in temporary storage. This concatenation process will continue 192 until no further context associations or other relevant topics or subtopics exists. Once the concatenation process is completed, the concatenated search molecule is available for use by the master search module 50, shown in FIG. 5. If there is another unprocessed topic 196 in the current target profile, the process starting at step 184 is repeated. Similarly, the query builder module checks for unprocessed users or community target profiles 198. The system returns to step 182 to process additional users or communities. If these do not exist, the query builder process 199 will end until the next scheduled iteration or user-initiated search.

Figure 10:
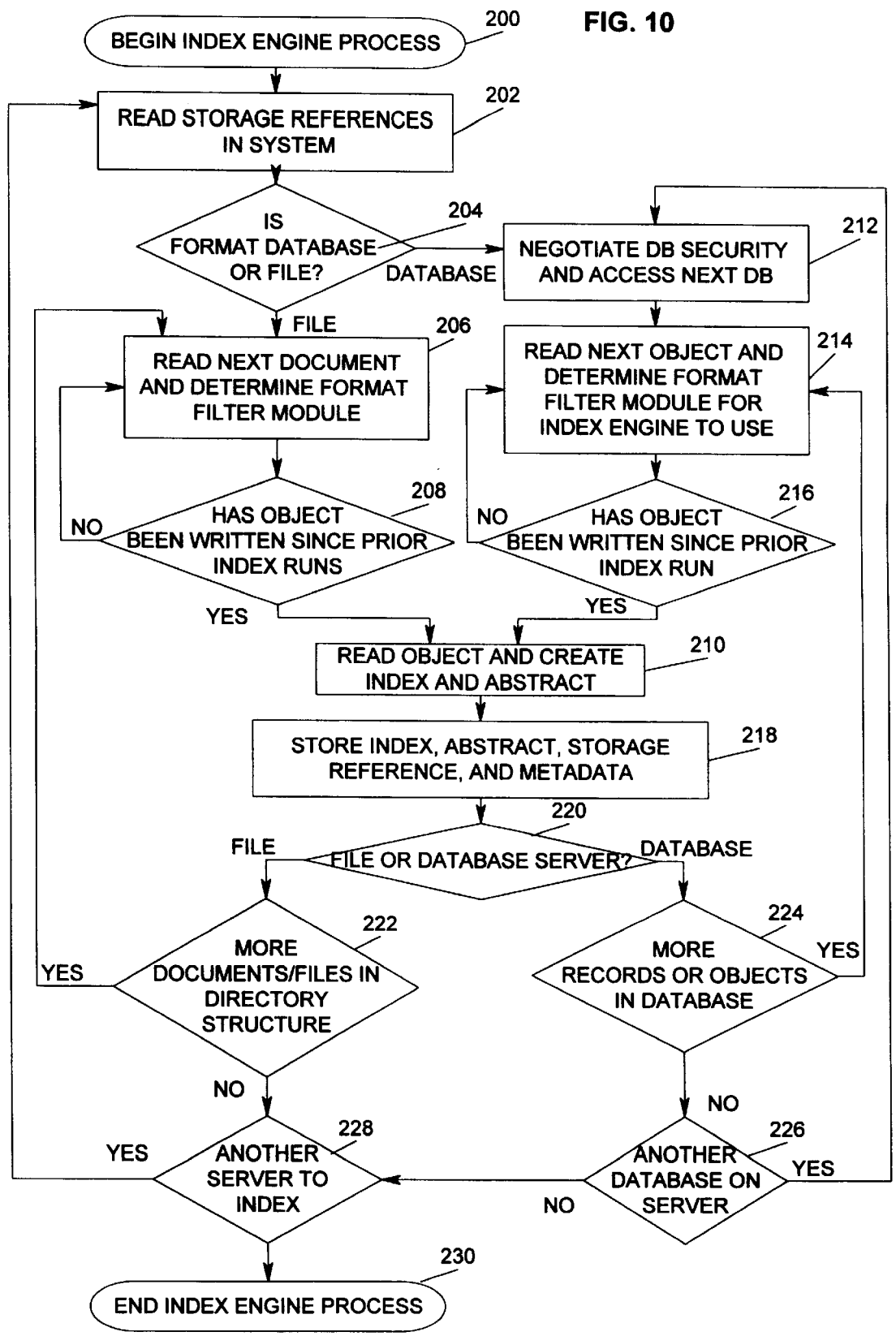
FIG. 10 is a flowchart showing steps taken by an indexing module in a search and retrieval information system and method.

FIG. 10 shows additional detail of the indexing process. The indexing module is shown to be started 200 either when a query is made against the indexing module or when an electronic object is returned by an autonomous search agent to the master search module for storage. As discussed above with reference to FIG. 5, there are many different possible ways for the indexing module to operate on internal documents, external documents or both. Assuming that all internal electronic objects will be indexed, the indexing module reads the storage references 202 written by the master search agent to see which servers, directories, and databases have material for indexing. The indexing module then determines 204 whether the format or structure of the electronic object is that of a file or database.

In the process shown in FIG. 10, if the structure is a file, the indexing module reads the file extension, header, and initial bytes of the file 206 to determine the file format. Thus, the appropriate format filter module can be selected. The indexing module then determines whether the object has been written to the indexing table 208 since the previous indexing module run If it has not been updated since an index was last created or the object has never been indexed, the next file is read and its format is determined for indexing. Otherwise, the indexing module will access 210 the appropriate filter module so that it can read the document and create a new full-text index and abstract for the updated electronic object.

If the format or structure of the electronic object is that of a database, the indexing module typically negotiates 212 the database's security and access the database. Next, the indexing module will select 214 the appropriate format filter module to format the electronic object for indexing. Finally, the indexing module will check to ensure that the electronic object has not already been written to the indexing table 216. After the indexing module has read the object and created an index and abstract of the electronic object 210, the indexing module stores 218 a full-text index abstract and location reference for the electronic object.

The indexing module typically ascertains whether the electronic object is a file or database server at step 220. If more files in a directory structure 222 or more objects in the database 224 still remain, the process is repeated starting at step 206 or step 214 respectively. Furthermore, if another database exists 226, the process of negotiating the security and accessing that database is continued starting at step 212. Finally, the indexing module will determine whether or not another server needs to be indexed 228. If so, the process of reading the storage references in the system will be repeated starting at step 202. If no more servers need to be indexed, the indexing module is terminated 230 until the next iterative cycle.

Figure 11:
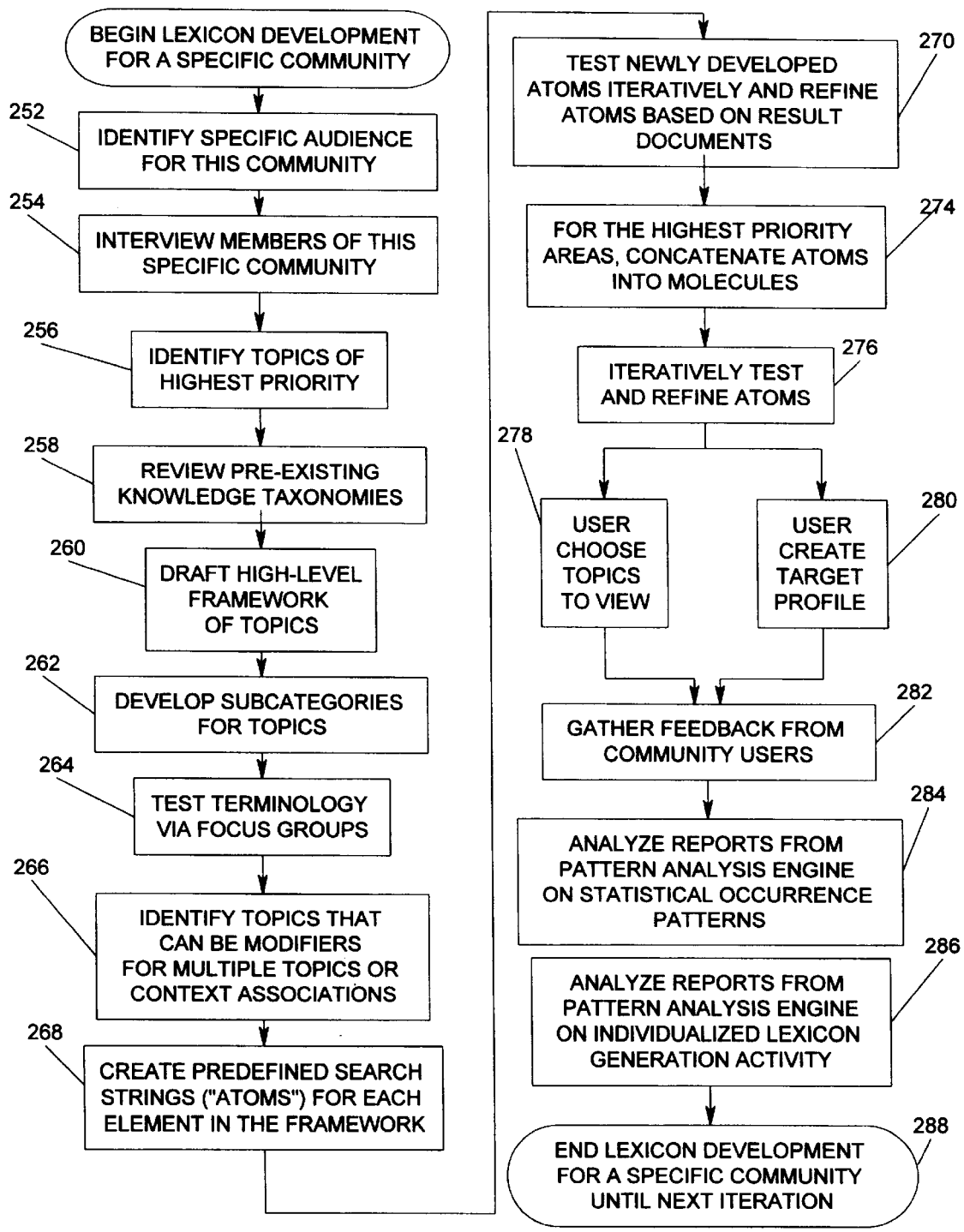
FIG. 11 shows steps taken by an administrator to develop a lexicon in a search and retrieval information system and method.

FIG. 11 shows how a lexicon may be developed for a specific community. First, a specific audience typically is identified 252 based upon the business rules or other frame of reference common to the audience. Members of the target audience can be interviewed 254 to determine the a) types and sources of new topics of interest to the community; b) the types and sources of learning and business performance improvement subjects of interest to the community; c) the types and sources of technical subjects of interest to the community; d) types and sources of financial and business management systems reports of interest to the targeted community; and e) the types and sources of other business documents and on-line discussion topics or subjects of interest to the community. Based on these interviews, the topic areas of highest priority 256 typically are identified. These interviews will also identify important data locations that may be made available for selection in the atlas. Lexicon development may proceed by reviewing 258 the vocabulary that applies to this audience, for example by referring to professional dictionaries or articles and by drafting 260 a high-level framework of the topic areas for the community. Where required, this high-level framework is further broken down into subcategories 262 for the topic area. The lexicon developed to this point should be tested 264 using focus groups to ensure that the terminology is within the framework of the topic concepts used by the community.

In developing the lexicon, another important aspect of the preferred embodiment is to ensure that topic areas are separated 266 into stand-alone lists where possible, such as industries, geographic locations, and company names. This serves to minimize the hierarchical relationships and maximize the many-to-many relationships for the query builder to concatenate. Predefined search queries 268 should be created for each topic, subtopic, context association, or report type utilizing the linguistic context of the community and the desired information resources that will be part of the system. These predefined search atoms should be tested 270 against appropriate content and refined accordingly. Similar to the predefined search topics and subtopics, each element of each free-standing context list typically is defined in the syntax 272 of the index module and search modules utilized. For complex topic areas that are of high priority to the community, the predefined search atoms typically is combined into molecules manually 274. This simulates the action of the query builder for a given profile. Subsequently, the search atoms or search molecules should be iteratively tested to ensure the accuracy of results 276. The lexicon developer can allow a user to choose the high-level topic areas 278 and create or personalize a target profile 280 in order to develop a default target profile. Feedback can be gathered from the community to assist with the development or refinement of the community lexicon predefined search queries 282. For ongoing maintenance and improvement, reports from the pattern analysis module that uncover relationships or statistical occurrences typically are examined 284 and used to refine the community lexicon. The reports from the pattern analysis module may also be analyzed for the individualized lexicon free form search queries 286. At this point, if the lexicon can effectively retrieve electronic objects placed on the community's interests and topics, lexicon development is complete 288.

Figure 12:
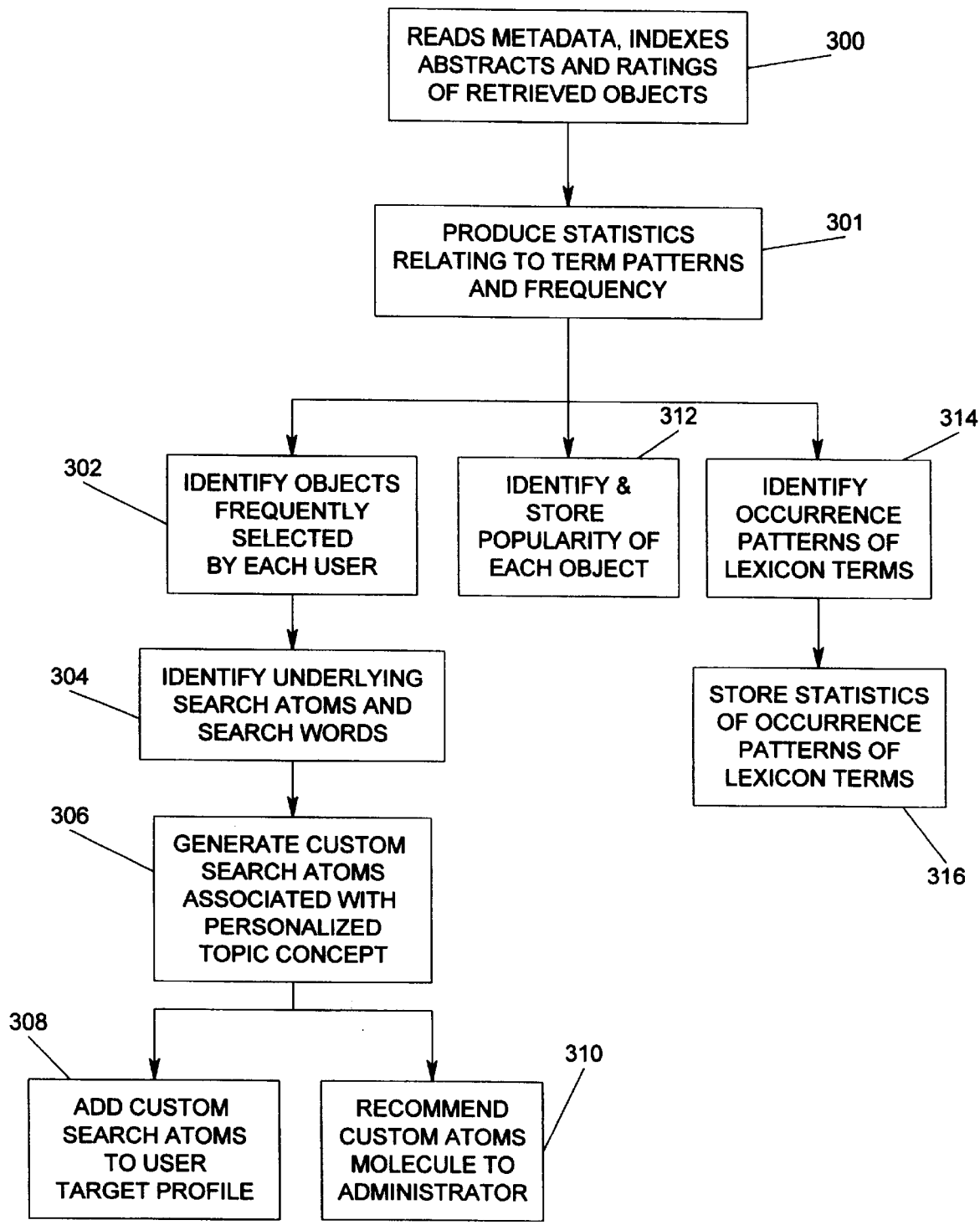
FIG. 12 is a flowchart showing steps taken by a pattern analysis module in a search and retrieval information system and method.

FIG. 12 details the procedure followed by the pattern analysis module when analyzing the electronic objects returned by the searching subsystem. The pattern analysis module first reads 300 metadata, indexes, abstracts, and ratings of the retrieved electronic objects stored in the index table. Statistics are produced 301 describing the frequency and patterns of terms in each object. The pattern analysis module may, more specifically, find the occurrence of lexicon terms 314. The occurrence of lexicon terms in association with other lexicon terms in electronic objects may also be compiled. These data can then be used for many different analysis purposes. The pattern analysis module itself may perform further processing of the data. In the alternative, the pattern analysis module may be configured to provide a pipeline of associated terminology for data analysis by other modules that may be added to the system.

One type of data analysis that can be performed by the pattern analysis module or an additional module is to identify improvements that could be made to the lexicon. The electronic objects may be identified based on the frequency 302 of selection. For the electronic object, the underlying search elements 304 are identified and custom search queries are generated 306 which are associated with the personalized topic area. The pattern analysis module is then able to automatically add 308 the custom search elements to the user target profile or recommend 310 the custom search elements to the system administrator.

A second type of analysis that could be performed by the pattern analysis module is to identify and store 312 the popularity of each object. This allows users to select those topic areas which are most popular within the community.

A typical pattern analysis module also identifies occurrences of patterns 314 of certain lexicon terms. The statistics 316 of the occurrence patterns of the lexicon terms are then stored and can be used to refine the lexicon or be fed to other processing modules.

An example of further processing of the frequency of occurrence of terms would be to find a pattern over time in the electronic documents. For example, the pattern of merger and acquisition venture activity could be identified over time for a specific company or specific industry. The pattern analysis module, or an added module, may be used to identify the other companies involved in the merger and acquisition ventures, the intensity of the activity, the other industries involved, or other useful information which involves plotting the occurrence of available lexicon terms or user-specified terms.

The various embodiments described above are provided by way of illustration only and should not be construed to limit the invention. Those skilled in the art will readily recognize the various modifications and changes which may be made to the present invention without strictly following the exemplary embodiments illustrated and described herein, and without departing from the true spirit and scope of the present invention, which is set forth in the following claims.

What is claimed:

1. A system for search and retrieval of electronic objects, the objects including electronically encoded information, the system comprising:
   a searching subsystem comprising
      one or more electronic lexicons in a memory within the system, wherein each lexicon is configured to provide predefined search elements designed to identify objects relevant to a specific community; and
      a format filter subsystem coupled to the searching subsystem comprising a plurality of format filter modules operable with the lexicon and configured to identify a format of an electronic object and to select a corresponding one of the format filter modules that will enable the system to search the object using the search elements within the lexicon;
   a profile management subsystem coupled to the lexicon comprising a community module, a profile module, and an atlas module, wherein the community module is configured to enable selection of a community lexicon, wherein each community lexicon includes a library of topics and search elements, wherein the profile module is configured to enable creation of a topic profile by selecting at least one topic from a library of topics, wherein each topic identifies a subject that is relevant to the information needs of the community, and wherein the atlas module is configured to enable creation of a user atlas by indicating at least one preferred data resource from a list of data resources from which objects may be retrieved;
   whereby potential sources of information can be easily searched and relevant information can be retrieved for a user.

2. The system of claim 1, wherein the searching subsystem further comprises a community module configured to enable selection of a lexicon, wherein each lexicon stores a library of topics and corresponding search elements.

3. The system of claim 2, wherein each topic within the library of topics is associated with one or more of the predefined search elements within the lexicon, and wherein each topic identifies a subject that is relevant to the information needs of the community.

4. The system of claim I, wherein the searching subsystem further comprises a profile module configured to enable creation of a target profile by selecting at least one topic from a library of topics, wherein each topic is associated with one or more of the predefined search logic elements and each topic identifies a subject or concept of interest that is relevant to the information needs of the community.

5. The system of claim 1, wherein the searching subsystem further comprises an atlas module configured to enable creation of a user atlas by selecting at least one preferred data resource from a list of data resources from which objects may be retrieved.

6. The system of claim 1, wherein the searching subsystem further comprises a query builder module which accesses a target profile, wherein the target profile lists at least one topic from a library of topics, wherein each topic is associated with one or more of the predefined search elements and each topic identifies a subject or concept of interest that is relevant to the information needs of the community, and wherein the query builder module is configured to create an electronic master search query by concatenating the search elements associated with each topic listed in the target profile.

7. The system of claim 6, wherein a master search module is configured to use the electronic master search query to search at least one electronic object within at least one database listed in a user atlas.

8. The system of claim 7, wherein the master search module is scheduled to automatically search for electronic objects at time intervals.

9. The system of claim 1, further comprising a retrieval subsystem comprising a retrieval module configured to select the corresponding one of the format filter modules for each object identified by the searching subsystem and deliver each object to the user in a viewing format.

10. The system of claim 1, further comprising an indexing subsystem comprising an indexing module configured to create an index of each object identified by the searching subsystem by compiling and storing in computer readable medium summary information that identifies the object;

whereby the system can quickly search the index of the indexed object.

11. The system of claim 1, further comprising a pattern analysis subsystem comprising a pattern analysis module configured to parse through the objects identified by the searching subsystem, and recognize and count words within each object that are in the lexicon.

12. The system of claim 1, further comprising a pattern analysis subsystem configured to locate additional terms within the identified objects according to frequency and location of the terms in relation to words within each object that are in the lexicon.

13. The system of claim 1, further comprising a pattern analysis subsystem configured to record a number of times that each object has been retrieved by the system.

14. A system for search and retrieval of electronic objects, the objects including electronically encoded information, the system comprising:

a searching subsystem comprising one or more electronic lexicons in a memory within the system, wherein each lexicon is configured to provide predefined search logic elements designed to identify objects relevant to a specific community and topic;

a format filter subsystem coupled to the lexicon comprising a plurality of format filter modules operable with the lexicon and configured to identify a format of an electronic object and to select a corresponding one of the format filter modules that will enable the system to search the object using the search elements within the lexicon; and a profile management subsystem coupled to the lexicon comprising a community module, a profile module, and an atlas module, wherein the community module is configured to enable selection of a community lexicon, wherein each community lexicon includes a library of topics and search elements, wherein the profile module is configured to enable creation of a topic profile by selecting at least one topic from a library of topics, wherein each topic identifies a subject that is relevant to the information needs of the community, and wherein the atlas module is configured to enable creation of a user atlas by indicating at least one preferred data resource from a list of data resources from which objects may be retrieved;

whereby potential sources of information can be easily searched by selecting relevant topics from a community lexicon and relevant information in many formats can be retrieved for a user.

15. The system of claim 14, further comprising an indexing subsystem comprising an indexing module configured to create an index of each object identified by the searching subsystem by compiling and storing in computer readable medium summary information that identifies each object located by the searching subsystem;

whereby the system can quickly search the index of the indexed object.

16. The system of claim 14, further comprising a pattern analysis subsystem comprising a pattern analysis module configured to sift through the objects identified by the searching subsystem, and recognize and count words within each object that are in the lexicon.

17. The system of claim 14, further comprising a pattern analysis subsystem configured to locate additional terms within the identified objects according to frequency and location of the terms in relation to words within each object that are in the lexicon.

18. The system of claim 14, further comprising a pattern analysis subsystem configured to record a number of times that each object has been retrieved by the system.

19. A method for search and retrieval of electronic objects, the objects including electronically encoded information, the method comprising:

identifying a format of an object to be searched;

selecting a format filter module that is configured to enable searching of the object; and searching the object using predefined search elements found in an electronic lexicon stored in a memory, wherein each lexicon is configured to provide the predefined search elements designed to identify objects relevant to a specific community and topic;

Managing a profile comprising a community module, a profile module, and an atlas module, wherein the community module is configured to enable selection of a community lexicon, wherein each community lexicon includes a library of topics and search elements, wherein the profile module is configured to enable creation of a topic profile by selecting at least one topic from a library of topics, wherein each topic identifies a subject that is relevant to the information needs of the community and wherein the atlas module is configured to enable creation of a user atlas by indicating at least one preferred data resource from a list of data resources from which objects may be retrieved;

whereby potential sources of information can be easily searched and relevant information can be retrieved for a user.

20. The method of claim 19, further comprising retrieving the object identified in the searching step by using the selected format filter module to present the object to the user in a viewing format.

21. The method of claim 19, the method further comprising selecting a community lexicon, wherein each community lexicon includes a library of topics corresponding search elements, wherein each topic within the library of topics is associated with one or more of the predefined search elements within the community lexicon, and wherein each topic identifies a subject or concept of interest that is relevant to the information needs of the community.

22. The method of claim 21, the method further comprising creating a target profile by selecting at least one topic from the library of topics.

23. The method of claim 19, the method further comprising creating a user atlas by selecting at least one preferred data resource from a list of data resources from which objects may be retrieved.

24. The method of claim 19, the method further comprising:
creating a target profile by selecting at least one topic from a library of topics, wherein each topic is associated with one or more of the predefined search elements and each topic identifies a subject that is relevant to the information needs of a community of users; and
creating an electronic master search query by concatenating the search elements associated with each topic listed in the target profile.

25. The method of claim 24, wherein the electronic master search query is used to search the object.

26. The method of claim 19, wherein the step of searching the object is scheduled to occur automatically at specified time intervals.

27. The method of claim 19, further comprising creating an index of an object that was identified in the searching step, by compiling and storing in computer readable medium summary information that identifies the object.

28. The method of claim 19, further comprising sifting through the objects identified in the searching step to recognize and count words within each object that are in the lexicon.

29. The method of claim 19, further comprising locating terms within the identified objects according to frequency and location of the terms in relation to words in each object that are in the lexicon.

30. The method of claim 19, further comprising:
retrieving objects that are identified in the searching step;
recording a number of times that each object has been identified; and
reporting the number of times that each object has been identified.

* * * * *

UNITED STATES PATENT AND TRADEMARK OFFICE
CERTIFICATE OF CORRECTION

PATENT NO. : 6,029,165
DATED : February 22, 2000
INVENTOR(S) : Gable

It is certified that error appears in the above-identified patent and that said Letters Patent is hereby corrected as shown below:

Column 2,
Line 15, insert the heading -- SUMMARY OF THE INVENTION --

Column 6,
Line 21, "Microsoft" should read -- Microsoft® --

Column 10,
Line 2, "10" should read -- 110 --

Signed and Sealed this

Eighteenth Day of September, 2001

Attest:

*Nicholas P. Godici*

NICHOLAS P. GODICI
*Attesting Officer*    *Acting Director of the United States Patent and Trademark Office*